April 30, 1968  J. W. NELSON ET AL  3,380,148
METHOD OF GUIDING AND LOCATING WELDING EQUIPMENT
FOR SUBSEQUENT WELDING
Original Filed Oct. 16, 1961  2 Sheets-Sheet 1

Jerome W. Nelson
Glenn E. Faulkner   INVENTORS
Harry C. Cook

BY Donald F. Wolters

PATENT ATTORNEY

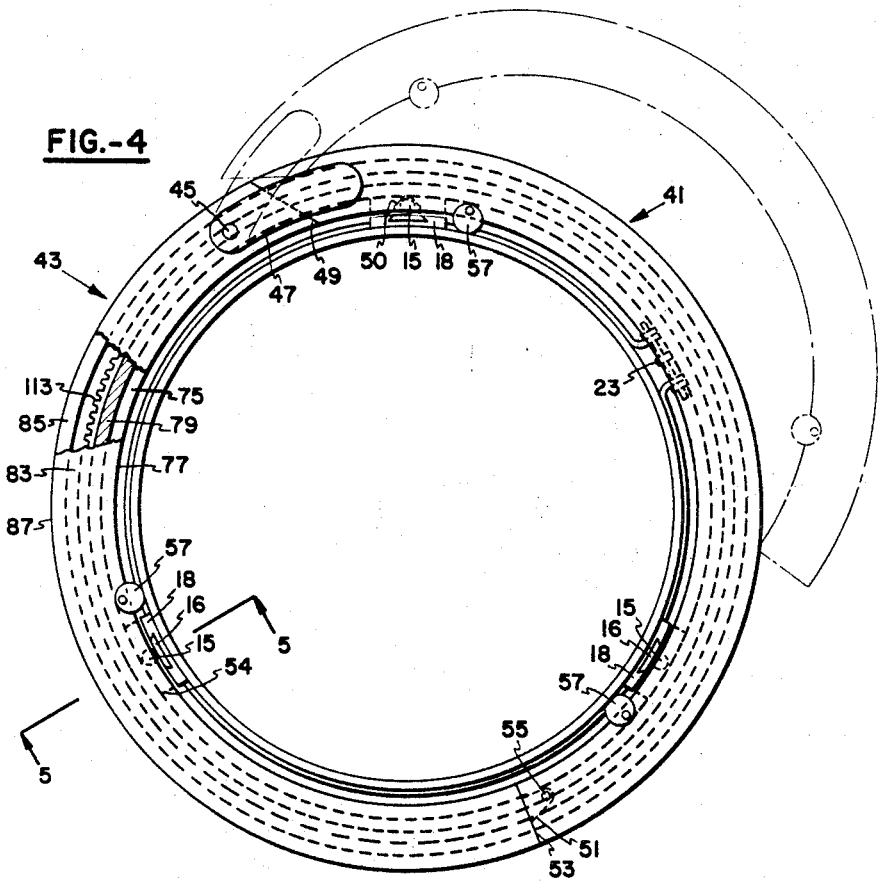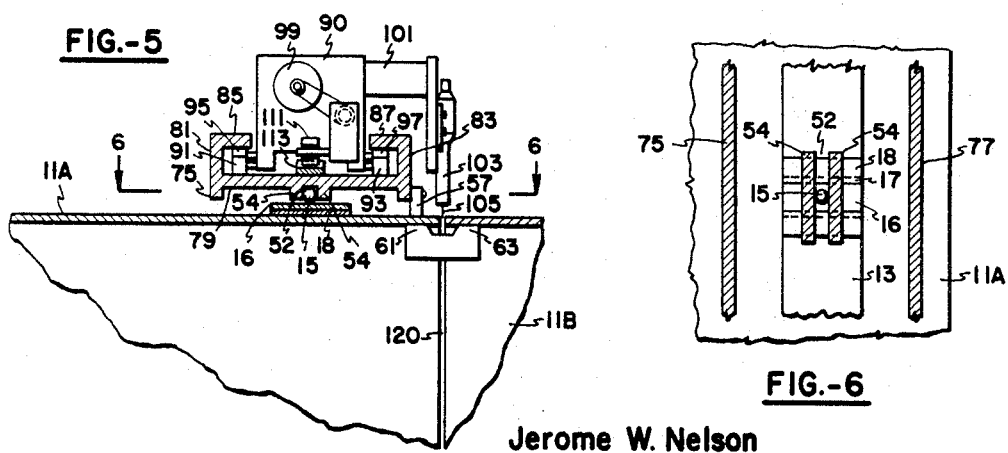
Jerome W. Nelson
Glenn E. Faulkner    INVENTORS
Harry C. Cook

United States Patent Office 3,380,148
Patented Apr. 30, 1968

3,380,148
METHOD OF GUIDING AND LOCATING WELDING EQUIPMENT FOR SUBSEQUENT WELDING
Jerome W. Nelson and Glenn E. Faulkner, Columbus, Ohio, and Harry C. Cook, Orange, N.J., assignors, by direct and mesne assignments, to Esso Research and Engineering Company, Elizabeth, N.J., a corporation of Delaware
Original application Oct. 16, 1961, Ser. No. 145,307, now Patent No. 3,196,245, dated July 20, 1965. Divided and this application Mar. 3, 1965, Ser. No. 451,084
3 Claims. (Cl. 29—464)

ABSTRACT OF THE DISCLOSURE

A method for quickly and accurately fastening the necessary welding equipment guide means in accurate predetermined relationship relative to the end of the pipe section. A preliminary guide means is first attached to the pipe end in accurate relationship, and thereafter a primary track guide means is in turn fastened to the pipe in fixed relation to the preliminary guide means, no subsequent adjustment of the welding equipment mounted upon the track is necessary in order to obtain accurate control of the welding equipment path of travel.

---

This is a division of application Ser. No. 145,307 filed Oct. 16, 1961, and now Patent No. 3,196,245.

The present invention relates to an improved method and apparatus for welding pipe lines and analogous tubular structures. It relates more particularly to a method and an apparatus for expediting the formation in the field of girth welds in large diameter pipe lines. The invention is also applicable to structures other than pipe lines wherein analogous problems are encountered.

In the past numerous efforts have been made to weld pipe lines economically and rapidly in the field. Until recently none of the methods proposed or the apparatus used have been particularly successful. Field conditions normally dictate that the pipe must be welded without rotation and, moreover, the equipment involved must be relatively simple and readily portable. These considerations restrict the freedom of choice of equipment which might otherwise be used.

Recently a system has been developed which involves performing, a preparatory operation such as a preliminary cutting, spacing or shaping of the joint between abutting pipe ends that are to be secured together, followed by welding the prepared joint, both operations being accomplished by orbiting an operative member around the non-rotated pipe. Under exceptional conditions the same apparatus and method can be applied to rotated pipe, for example, in double-joining operations. Normally in the field, however, the pipe is non-rotatable.

While the process and apparatus just mentioned have been operated successfully, their application to pipe lines of large diameter has involved certain difficulties. It is one object of the present invention to solve these difficulties.

One difficulty is that the system used to orbit the operative member around the pipe must be accurately aligned with the ends of the pipe. The travel of the orbital member must be in a plane perpendicular to the pipe axis. It is an object of the present invention to expedite the formation of girth welds in large diameter pipe lines by pre-positioning a bed or gauging member on the pipe preliminary to mounting the actual operating equipment. This bed or gauging member then is used to locate the system so that it is accurately aligned with respect to the joint.

A further object is to provide light, easily portable, pre-positioning equipment which can be quickly mounted on a pipe to form a bed or a gauging unit for separate annular track equipment. The actual operating elements are mounted on the track for orbital or planetary travel about the pipe.

It is a further and specific object to reduce substantially the time required for forming girth weld joints in large diameter pipe lines. In the present invention, this is accomplished by mounting simple bed or gauging equipment in accurately determined position on the pipe preliminary to setting thereon the heavier functional equipment. In this way, with relatively little manpower, the preliminary gauging equipment may be mounted one or more joints ahead of the welding operation, and the whole operation may be expedited considerably. The followup of the welding operators who mount the track or guiding units on the pipe line as the joint is to be formed, is considerably speeded up by the pre-positioned bed which is readily and quickly installed.

The invention will be more clearly understood by reference to the accompanying drawings, wherein:

FIG. 4 is an end view with the pipe shown in section, showing the track system that guides the operating equipment installed and ready for a welding operation;

FIG. 5 is a fragmentary sectional view taken substantially along the line 5—5 of FIG. 4, showing in outline an operating welding carriage in addition to the elements illustrated in FIG. 4;

FIG. 6 is a fragmentary sectional view with parts broken away, taken substantially along the line 6—6 of FIG. 5, showing the relationship between the guide track and the pre-positioning gauge elements of the mounting bed.

Figure 1:
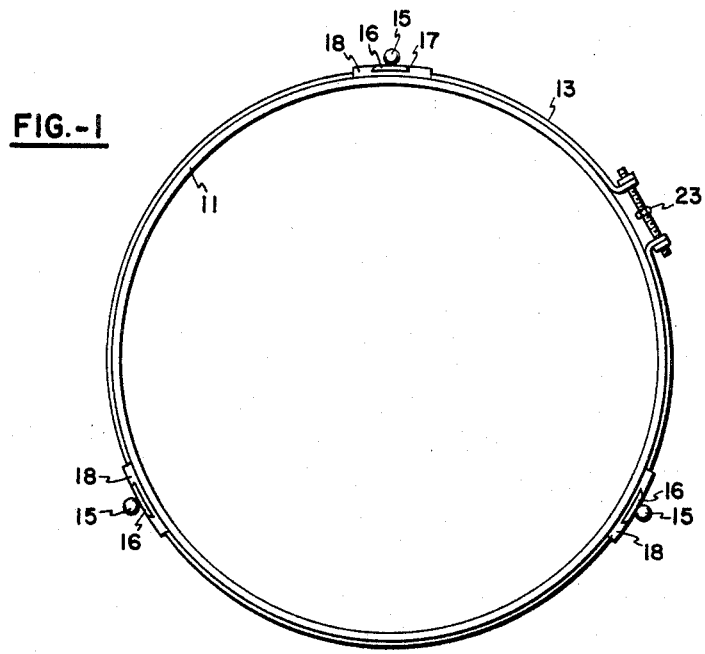
FIG. 1 is an end elevational view of a large pipe having mounted thereon pre-positioning or gauging equipment according to one form of the present invention.
Figure 3:
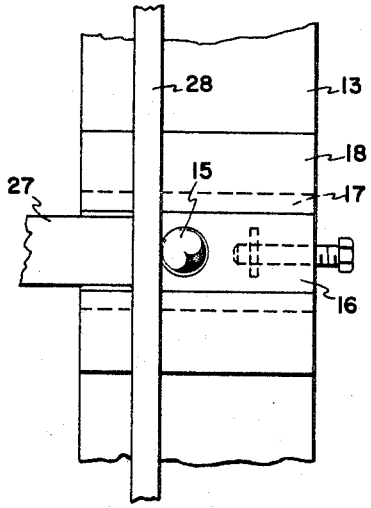
FIG. 3 is an enlarged fragmentary detail view showing one of the precision gauging elements on the pre-positionable bed equipment.

Referring first to FIG. 1, there is shown a typical pipe section 11 in end elevation, on which is mounted a split band or ring 13 having precise gauging blocks or elements 15. Three gauging blocks are used to establish the plane parallel to the end of the pipe (and substantially perpendicular to its axis). They are preferably spherical balls suitably supported. As shown herein the gauging blocks 15 (see FIG. 3) are mounted on slide blocks 16 which fit into dovetail grooves 17 in blocks 18 welded or otherwise secured to the bed ring 13 so that they can be adjusted independently of said ring. The latter preferably consists of a thin steel band that is tightened on the pipe wall by any suitable means such as a turnbuckle 23 FIG. 1. Instead of the turnbuckle, a quick release toggle or cam type tightener of well known type may be employed. Any suitable holding means may be used that will apply sufficient pressure between the band and pipe to keep the bed or ring from shifting under the normal impacts to be expected when the track apparatus is installed about the pipe.

Figure 2:
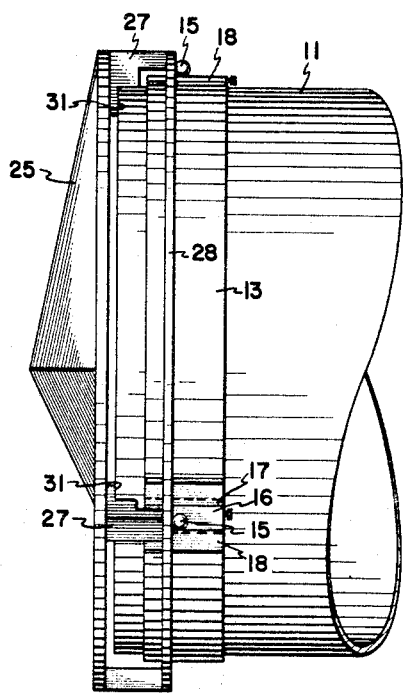
FIG. 2 is a side elevational view of a portion of the pipe showing the equipment of FIG. 1 plus an adjusting gauge which may be used to pre-position the bed or gauging equipment proper.

Before tightening, the band 13 is applied to the pipe so that the positioning blocks 15 are almost touching the application or spanner gauging member 25, FIG. 2, when the latter is held against the pipe end. This member 25 has arms 27 (see also FIG. 3) carrying a ring 28 which is adapted to fit snugly against the gauging elements 15. Member 25 also has surfaces 31 which are brought to bear against the machined end surface of the pipe so that, the lengths of arms 27 all being equal, the gauging blocks 15 can be adjusted to a precise distance from the machined end of the pipe. After the parts have been properly positioned, the turnbuckle or other tightener 23 may be tightened to secure the pre-positioned bed in place. After turnbuckle 23 is tightened, the gauging blocks are moved into firm contact with the gauging member 25 to obtain the desired precise alignment.

Now referring to FIG. 4, the guide track which will serve to support as well as to guide the operating elements used in welding, is formed of a plurality of relatively movable segments 41 and 43. In the form shown in FIG. 4, there are two such segments hinged together about a hinge pin 45. The track members are fitted with interleaved ears or hinge elements 47 which engage the hinge pin. Alternate elements are cut away as indicated at 49 to permit opening the assembly to and beyond the dotted line position shown in FIG. 4. This obviously is required for removing the assembly from the pipe line after a welded joint has been completed. Otherwise the unit would have to be slid along the pipe to the next joint, requiring removal of pipe supporting blocks and probably interference with obstructions in the excavation, such as projections of rock, etc.

The track members 41 and 43 are constructed to engage the gauging blocks 15 when the track members are in the closed position. The gauging block 15 at the top of the pipe engages the track through a cone-shaped hole or recess 50 to position the track both radially and axially. Recess 50 is located near the hinge 45, 47. At the sides of the pipe, other gauging blocks 15 engage the track through slots 52 formed in base members 54 integral with the track. See FIG. 6. These positioning elements bring the track into proper axial alignment as it is closed to operative position. Slots 52 rather than holes such as 50 are used to allow some relative circumferential movement as the track is opened. The depth of the slots and height of the positioning blocks are designed to allow engagement under the normal extremes of eccentricity or other out-of-roundness that may be expected in commercial line pipe.

At their free opposite ends, the track segments 41 and 43 are joined by interleaved tongue and plate elements 51 and 53 respectively. A locking device 55 holds the unit together, after which a strong tensioning means may be applied to bear against the pipe wall and hold the track in place by heavy frictional engagement. Various means may be used for this purpose but as herein shown, a series of eccentrically mounted clamping blocks 57 are used. Obviously hydraulic pressure means could be substituted, as well as other mechanical locking devices well known in analogous arts.

Inside of the pipe there is provided a suitable clamping device of conventional type. The particular clamping means employed forms no part of the present invention, except that it preferably includes "strong back" elements which bridge the gap between the two pipe sections. One of these is seen in FIG. 5 as having end engaging elements 61 and 63 which engage respectively pipe section 11A seen at the left of FIG. 5, and the newly installed pipe section 11B shown at the right. Suitable toggle arms or other pressure applying elements, not shown, apply heavy pressure independently to the respective ends of the strong back bars. It will be understood that the means for applying such pressure may consist of a hydraulically operated piston or any suitable mechanical arrangement for insuring uniform application of clamping pressure to the elements 61, 63. By separate application of force to the two ends, one pipe end may be clamped while the other is released or vice versa.

Referring more specifically to FIGS. 4 and 5, the track elements 41, 43 have a generally channel-shaped configuration involving base or rib elements 75, 77 which fit reasonably closely to the pipe surface, a transverse web element 79 which connects these, and upstanding flange members 81, 83 having inwardly turned rim elements 85 and 87 respectively. The flange elements 85, 87 overlie the carrying rollers 91, 93 of a carriage structure 90, and additional holding rollers 95, 97; the latter bear against inturned rim elements 85 and 87 to keep the carriage on the track regardless of its position around the pipe. The carriage structure per se is not part of the present invention and the illustration of it is sufficient only to aid in describing the present invention and its applicaton to pipe line welding. The carriage may be varied in form and the cross-section of the track may be varied also.

Means including a drive motor 99 which may impart power to a spur gear 111 which engages a rack or gear 113 on the track provides for travel of the carriage about the supported track. It will be understood that suitable means for adjusting the alignment, pressure, etc. of the guide rollers etc., and their relationship to the supporting surfaces, will be provided as will be obvious to those skilled in the art.

The carriage 90, as shown, supports by means of an arm 101 a welding head 103, to which welding material such as welding wire 105 may be supplied in a well known manner.

Referring again to FIG. 5, the gauge block 15 engages slot 52 formed by rib elements 54 so that the track is properly aligned. With this alignment, the carriage carries the welding head properly around the track. Hence it will be understood that when the track is applied to the pre-positioned bed and the matching surfaces carefully and precisely engaged, the track may be readily clamped in place and be properly positioned for the welding operation. This is highly important since the kerf 120, FIG. 5, is a very narrow slot and the welding wire preferably should be fed substantially to the middle of this narrow slot. Hence the carriage must travel in a plane which is truly perpendicular to the pipe axis (within reasonable tolerances). Control elements may be provided for assuring even more precise wire alignment, etc., but these form no part of the present invention.

It will be understood that the carriage per se may include other elements in addition to, or even in lieu of the welding head 103. It preferably includes a thin cutting device, not shown herein but described in detail in copending application, Ser. No. 60,684, filed Oct. 5, 1960, now Patent No. 3,084,244. Suitable drive means also may be provided therefor so that the kerf 120 may be cut to fairly precise dimensions preparatory to the welding operation. The carriage 90 may support both the cutting element and the welding head, or a separate carriage may be provided for each if desired.

From the foregoing it will be understood that the apparatus described facilitates field welding operations by making it possible for one or two members of a crew to go ahead of the welding operation and carefully but quickly install the pre-positioning bed equipment. Following this, the operating crew can lift the considerably heavier guide track equipment and carriage into place, set it quickly, clamp it firmly (along with installation of the internal clamp, where used) and the welding operation and related operations may proceed immediately. Without this pre-positioning feature, time required for mounting and positioning the relatively heavy and rigid guide track equipment tends to become excessive in field operations. Experience has shown that the total time required is substantially reduced and the operation substantially expedited by the pre-positioned bed technique.

As indicated above, the clamping or strong back bar elements 61, 63 are provided to hold the pipe ends in proper relative position, including proper end-to-end spacing and proper axial alignment. It will be understood that ordinarily the clamping bars 63 and 61 will be firmly interconnected so that they hold the pipes in proper relative position to each other throughout the operation. In any case, the clamping equipment should clear the actual welding situs so as not to interfere with either the preparatory cutting operation or the welding itself. The preferred welding process normally does not require, and preferably avoids, use of a copper or other back-up member inside the welded joint, as is used in some prior art processes. The clamping devices likewise should not interfere with cutting or welding.

From the foregoing it will be appreciated that various alternates and modifications may be made without departing from the spirit of the invention. It is intended to include such within the scope of the following claims so far as the prior art permits.

What is claimed is:

1. The method of guiding and accurately locating heavy and bulky welding equipment upon a metal structure for forming a weld along an edge of said structure comprising the steps of locating a gauge on said structure with portions thereof in abutment with said edge for establishing a predetermined line, positioning a preliminary guide means of relatively light weight having a plurality of adjustable means upon said structure adjacent said gauge, locking said guide means in fixed relationship to said metal structure, adjusting said adjustable means into alignment with the line established by said gauge, and thereafter removing said gauge and fixedly mounting a primary guide means for said welding equipment on said metal structure in a position determined by said preliminary guide means thereby permitting direct subsequent location of said welding equipment upon said primary guide means in known predetermined accurate relationship relative to said line and edge of said metal structure without need for subsequent adjustment of said heavy and bulky welding equipment relative to said line.

2. The method of quickly and accurately locating heavy and bulky welding equipment upon the exterior of a pipe for forming a weld between the end of said pipe and an adjacent pipe comprising the steps of locating a gauge at the end of said pipe with portions thereof in abutment with said end for establishing a predetermined flat plane on the exterior of said pipe inward of said end with respect to the weld to be made, positioning a preliminary guide means of relatively light weight having a plurality of adjustable gauging means about said pipe, locking said guide means in fixed relation to said pipe, adjusting said gauging means into alignment with the plane established by said gauge, removing said gauge from the end of said pipe, and thereafter fixedly mounting a primary guide means for said welding equipment on said pipe in a position determined by said preliminary guide means thereby permitting direct subsequent location of said welding equipment upon said primary guide means in known predetermined accurate relationship relative to the end of the pipe to be welded without need for subsequent adjustment of said welding equipment relative to said pipe weld.

3. The method of quickly and accurately locating heavy and bulky welding equipment upon the surface of a metal structure for forming a weld along an edge of said structure and an adjacent structure comprising the steps of locating a gauge on said structure with portions thereof in abutment with said edge for establishing a predetermined line adjacent said edge with respect to the weld to be made, positioning a preliminary guide means of relatively light weight having a plurality of adjustable gauging means upon said structure adjacent said edge, locking said guide means in fixed relation to said structure, adjusting said gauging means into alignment with the line established by said gauge, removing said gauge from the structure, and thereafter fixedly mounting a primary guide means for said welding equipment on said structure in a position determined by said preliminary guide means thereby permitting direct subsequent location of said welding equipment upon said primary guide means in known predetermined accurate relationship relative to the edge of the structure to be welded without need for subsequent adjustment of said welding equipment relative to the edge of said structure.

References Cited

UNITED STATES PATENTS

| | | | |
|---|---|---|---|
| 1,499,498 | 7/1924 | Bienenstok | 228—29 X |
| 1,775,311 | 9/1930 | Halle | 228—29 X |
| 2,155,705 | 4/1939 | Gottwald | 269—2 |
| 2,817,745 | 12/1957 | Pilia | 219—61 |
| 2,894,111 | 7/1959 | McNutt | 219—60.1 |
| 2,956,147 | 10/1960 | Baker | 219—60.1 X |
| 3,042,787 | 7/1962 | Kotecki | 219—60.1 |
| 3,084,244 | 4/1963 | Rieppel | 219—60 |
| 3,084,246 | 4/1963 | Rieppel | 219—125 |

JOHN F. CAMPBELL, *Primary Examiner.*

R. F. DROPKIN, *Assistant Examiner.*